United States Patent [19]

Nimura et al.

[11] Patent Number: 5,576,871
[45] Date of Patent: Nov. 19, 1996

[54] METHOD FOR OPTICAL COMMUNICATIONS

[75] Inventors: Hijiri Nimura; Akira Fujisaki; Haruki Ohgoshi, all of Tokyo, Japan

[73] Assignee: The Furukawa Electric Co., Ltd., Tokyo, Japan

[21] Appl. No.: 449,945

[22] Filed: May 25, 1995

[30] Foreign Application Priority Data

Jul. 25, 1994 [JP] Japan ................................ 6-192843

[51] Int. Cl.$^6$ ................................ H04B 10/08
[52] U.S. Cl. .................... 359/110; 359/184; 359/173; 356/73.1
[58] Field of Search ................... 359/110, 158, 359/173, 183–184; 356/73.1; 375/257, 287, 288, 317; 250/227.17

[56] References Cited

U.S. PATENT DOCUMENTS

| | | | |
|---|---|---|---|
| 4,840,482 | 6/1989 | Shigematsu et al. | 356/73.1 |
| 5,202,746 | 4/1993 | Sentsui et al. | 356/73.1 |
| 5,329,348 | 7/1994 | Nimura et al. | 356/73.1 |
| 5,331,392 | 7/1994 | Fujisaki et al. | 356/73.1 |

*Primary Examiner*—Leo Boudreau
*Assistant Examiner*—Kinfe-Michael Negash
*Attorney, Agent, or Firm*—Jacobson, Price, Holman & Stern, PLLC

[57] ABSTRACT

There is provided a method for optical telecommunications with which an optical signal modulated for the plane of polarization can be received for certain without lowering the threshold level and being affected by noises so that any optical telecommunications can be identified without fail. With the method, an optical signal is modulated by continuous pulses a at the transmitting side before transmission and a predetermined number (n) of pulses a are extracted within a given period of time in synchronism at the receiving side so that the presence of a modulated optical signal is acknowledged only when the number of pulses a received within the given period of time is smaller than the predetermined number (n) but greater than another predetermined number (m) (n≧m). This method may be so modified that the absence of a modulated optical signal is acknowledged even when the above defined number of pulses are received if k or more than k (k≧1) noise signals b are found between any successive two of the received pulses.

1 Claim, 2 Drawing Sheets

(O INDICATES A DETECTED PULSE)

METHOD FOR OPTICAL COMMUNICATIONS

BACKGROUND OF THE INVENTION

1. Field of the Invention

This invention generally relates to optical telecommunications and, more particularly, it relates to a method of identifying a particular optical path out of a plurality of optical paths in the form of optical fibers housed in a duct or pipe or laid in a telecommunications station for optically transmitting low frequency signals and/or other signals in an optical telecommunications system.

2. Prior Art

In recent year, the demand for optical fibers is remarkably expanding and optical LAN systems are widely used for so-called intelligent buildings. Such a system normally comprises a large number of optical paths housed in ducts and pipes and much more optical paths are expected to be installed for subscribers' networks in the near future.

Once optical paths are established in a duct or pipe, a problem may arise in identifying a particular optical path when it has to be singled out for removing or branching because all the optical paths installed there resemble each other and there is no way of identifying a particular one by appearances.

The problem of singling out a particular optical path becomes very serious when hundreds of optical fiber cores are densely arranged within a single optical cable. If a live optical path is mistakenly disconnected in an operation of connecting or removing optical fiber cores, the result can be disastrous in the modern society where people heavily rely on transinformation for sustaining their lives. Therefore, optical paths in modern optical telecommunications systems have to be identified accurately and rigorously by any means.

There has been proposed a method of identifying a particular optical path, utilizing fluctuations in the polarized light passing through the single mode optical fiber. With this method, an external signal typically in the form of an ultrasonic wave is applied to an optical path in an optical cable or the like from outside by utilizing the Faraday effect or some other acousto-optical effect to transmit the oscillation of the externally applied signal to the single mode optical fiber in the cable so that the optical signal being transmitted through the optical path may become fluctuated by the externally applied signal. Then, the particular single mode optical fiber can be identified by observing the fluctuations in level of the optical signal running through the optical fiber.

This will be described further by referring to FIGS. 5 and 6 of the accompanying drawings. Referring firstly to FIG. 6, polarized light from light source (LD) 23 is made to pass through optical path 1 of a single mode optical fiber and, while the polarized light is passing through the optical path, an external signal in the form of an ultrasonic wave is externally applied to the optical path 1 by means of an external optical modulator 21 that utilizes an acousto-optical effect so that the optical signal being transmitted through the single mode optical fiber may be modulated for the plane of polarization. Then, the light passing through light detector 29 arranged upstream to light receiving device (O/E) 31 is checked for fluctuations in the level of the signal arriving through the optical path to see if it is the right optical path to be singled out.

The external optical modulator 21 typically comprises a piezo-electric device for converting an electric signal into an acoustic signal. In actual applications, three regularly and angularly spaced external optical modulators 21 may be arranged around optical path 1 so that three acoustic signals may be applied to it from three different directions, although, alternatively, more than three external optical modulators may be used if they are angularly spaced at regular intervals around the optical path.

It may be needless to explain the significance of arranging a plurality of external optical modulators 21 around the outer periphery of a duct or cable containing a large number of single mode optical fibers in the operation of identifying a particular single mode optical fiber out of them when their relative positions are not known at a particular location along the duct or cable. With such an arrangement, electric signals may be applied to the respective external optical modulators 21 simultaneously or sequentially.

With the arrangement of optical signal transmission of FIG. 6, the state of polarization of the optical signal received by the light receiving device can be affected by external turbulences and/or the residual stress in the single mode optical fiber to become unstable and show significant fluctuations. In an attempt to get rid of this problem, there has been developed a technique of polarization diversity reception, with which the optical paths in a duct or cable are divided into groups facing different directions so that a group that is currently most stable may be used for optical telecommunications. Another known technique developed to counter the problem is the use of a polarization scrambler that can randomly modulate the state of polarization to artificially produce a best state and a worst state of polarization.

While any particular optical path 1 has to be accurately identified by any means in a modern optical telecommunications network as emphasized earlier, the known modulation techniques are disadvantageous in that they also can be vitally and adversely affected by external turbulences and other causes of troubles because they are designed to modulate the optical signal in an optical path for the plane of polarization by applying an external signal to it. In other words, where external turbulences exist, the signal modulated by an external signal for the plane of polarization cannot be identified with a reliability of 100%. Therefore, with any of the above described known techniques of screening a number of optical paths transmitting respective optical signals simply on the basis of "presence" or "absence" of a modulated signal, it is difficult to accurately identify a particular optical path.

A known proposed solution for the problem of accurately identifying a particular optical path transmitting an optical signal that has been modulated for the plane of polarization consists in lowering the threshold for discriminating optical signals. However, with a lowered threshold level, noises can be received as signal components which makes it difficult to single out a particular optical path transmitting a modulated optical signal. Therefore, this idea is not feasible for solving the problem of accurately identifying a particular optical path. Additionally, when a large noise is produced abruptly, it can be mistaken for an optical signal and erroneously received by the receiver to give rise to another problem in identifying a particular optical path out of large number of optical path.

In view of these circumstances, it is therefore the object of the present invention to provide a method for optical telecommunications with which an optical signal modulated for the plane of polarization can be received for certainty without lowering the threshold level and therefore a particular optical fiber (to which an external signal has been applied) can be accurately identified out of a plurality of optical fibers.

SUMMARY OF THE INVENTION

According to the invention, the above object is achieved by providing a method for optical telecommunications comprising a step of transmitting an optical signal through an optical path of an optical fiber in a plurality of optical paths laid in the form of a cable or the like from the transmission side, applying an external signal to the optical path to modulate the optical signal being transmitted therethrough for the plane of polarization and receiving the optical signal at the receiving side to determine the presence or absence of a modulated optical signal, characterized in that the optical signal is modulated by continuous pulses a at the transmitting side and a predetermined number (n) of pulses a are extracted within a given period of time in synchronism at the receiving side so that the presence of a modulated optical signal is acknowledged only when the number of pulses a received within the given period of time is smaller than the predetermined number (n) but greater than another predetermined number (m) (n≧m).

The above described method of the invention may be so modified that the absence of a modulated optical signal is acknowledged even when the above defined number of pulses are received if $\underline{k}$ or more than $\underline{k}$ ($k≧1$) noise signals b are found between any successive two of the received pulses.

With the above described method of the invention, since the optical signal transmitted from the transmission side is modulated by continuous pulses a and a total of n pulses $\underline{a}$ are extracted in synchronism within a given period of time at the receiving side so that the presence of the modulated optical signal is acknowledged only when a total of m pulses a are received within the given period of time (n≧m), the reliability of the operation of detecting the presence of a modulated signal can be enhanced by allocating a large numeral to $\underline{m}$ when the state of polarization of the optical signal being transmitted through the optical path is fluctuating and becomes unstable. Thus, with this arrangement, optical signals having an amplitude greater than a predetermined level can be reliably detected and an optical signal modulated by applying an external signal can be easily and surely discriminated from the rest.

With the modified method of the invention as described above, since the absence of an modulated optical signal is acknowledged when noise signals $\underline{b}$ are found between any successive two of the received pulses, a long noise extending over n pulses would not be mistakenly acknowledged as an optical signal. Thus, a noise $\underline{b}$ having a large amplitude may not be mistakenly detected as an optical signal so that an optical fiber carrying an optical signal modulated by an external signal can be identified for certainty.

DETAILED DESCRIPTION OF THE INVENTION

Now, the present invention will be described in greater detail by referring to a preferred embodiment of the invention schematically illustrated in FIG. 1. With this embodiment of method for optical telecommunications, an optical signal (continuous light from a light source (e.g., LD) arranged on the transmitting side is transmitted through an optical fiber (single mode optical fiber) 2 of an optical path 1 and an external signal having a frequency of, for example, 100 kHz as shown in FIG. 2 is applied to the optical path 1 transmitting the optical signal by means of an external optical modulator 21 to modulate the optical signal for the plane of polarization do that the optical signal modulated for the plane of polarization is received by means of a light detector 29 and converted to a light-intensity modulated signal having a frequency of 100 kHz at the receiving side, which signal is then received by a light receiving diode (O/E converter) 31. Under this condition, a redetermined number (n) of pulses a are extracted out of the signal in synchronism with the timing of appearance of pulses a at the receiving side and the presence of an optical signal modulated for the plane of polarization is acknowledged only when $\underline{m}$ or more than $\underline{m}$ pulses (n≧m) are observed.

Figure 1:
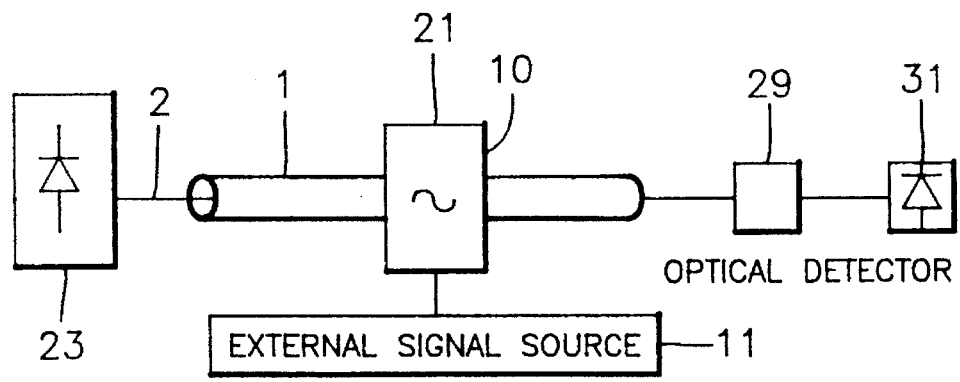
FIG. 1 is a schematic diagram illustrating an optical telecommunications system to be used with a method for optical telecommunications according to the invention.
Figure 2:
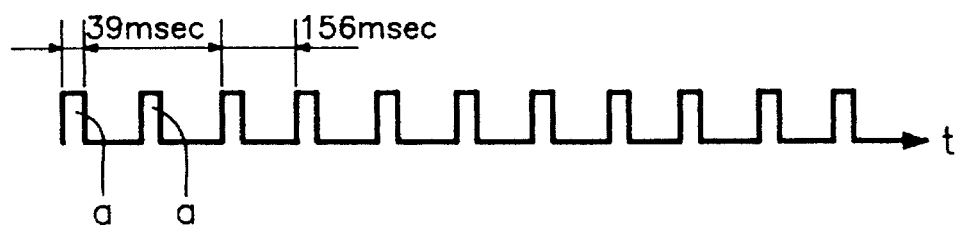
FIG. 2 is a schematic illustration of an optical signal to be used for a method for optical telecommunications according to the invention.
Figure 5:
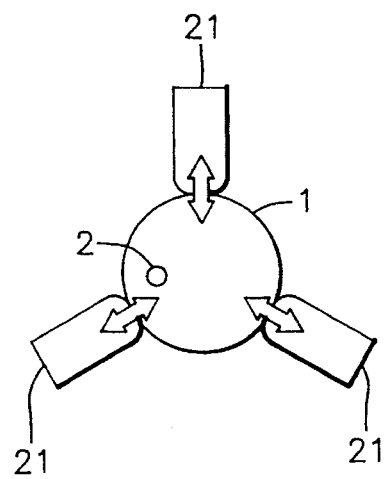
FIG. 5 is a schematic illustration showing a possible arrangement of conventional external optical modulators to be used for optical telecommunications applications.
Figure 6:
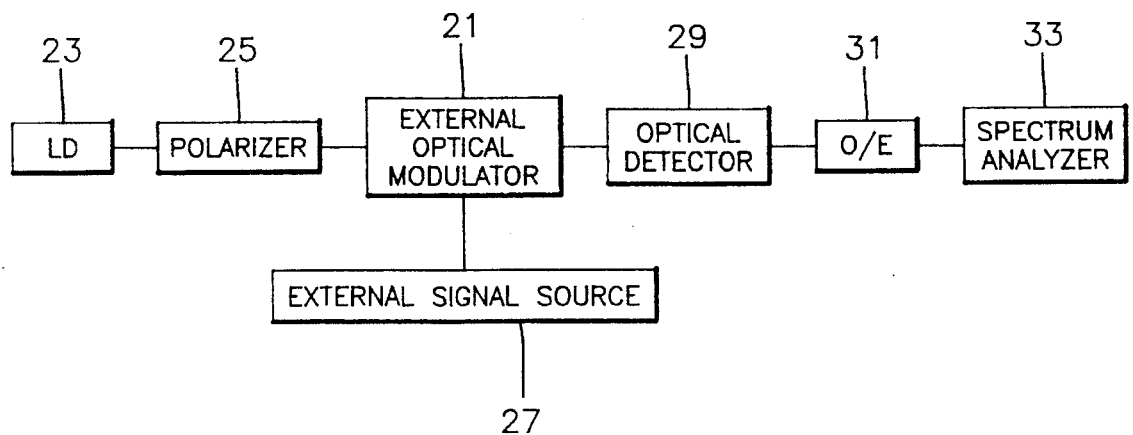
FIG. 6 is a schematic diagram illustrating an optical telecommunications system to be used with a conventional method for optical telecommunications.

The optical modulator 21 of FIG. 1 may be a conventional optical modulator as described above by referring to FIG. 5 and a plurality of such optical modulators 21 may he arranged in a manner as described above and illustrated in FIG. 5, although a different arrangement may also be possible. The optical modulator 21 comprises, as shown in FIG. 1, a mechanical portion 10 designed to apply an external signal to the optical path 1 and an electric circuit portion (source of external signals) 11 designed to control the applied external signal, of which the electric circuit portion 11 can continuously generate pulses a having a pulse width of 39 msec and a period of 156 msec as illustrated in FIG. 2, which pulses s are then sufficiently amplified and applied to a piezo-electric device of the mechanical portion 10 so that the piezoelectric device that is driven by AC with a frequency of 100 kHz by turn generates an ultrasonic wave. The generated ultrasonic wave signal is externally applied to the optical path 1.

The ultrasonic wave signal externally applied to the optical path 1 is then carried by the optical signal running through the optical fiber 2 so that the optical signal 2 is modulated by the ultrasonic wave signal under an acousto-optical effect for the plane of polarization before it gets to the receiving side.

At the receiving side, upon receiving the first pulse a, the light detector 29 starts receiving pulses a in synchronism with the reception of the first pulse a and, more specifically, it repeats the operation of receiving a pulse for n times (eight times in FIG. 2) with a period of 156 msec for each reception. The presence of a modulated optical signal is acknowledged only when m or more than m pulses (three in FIG. 2) are actually received. Then, it is determined that the optical path 1 being observed for pulse reception is the optical path 1 to which the external signal was applied a short while ago.

Figure 3:
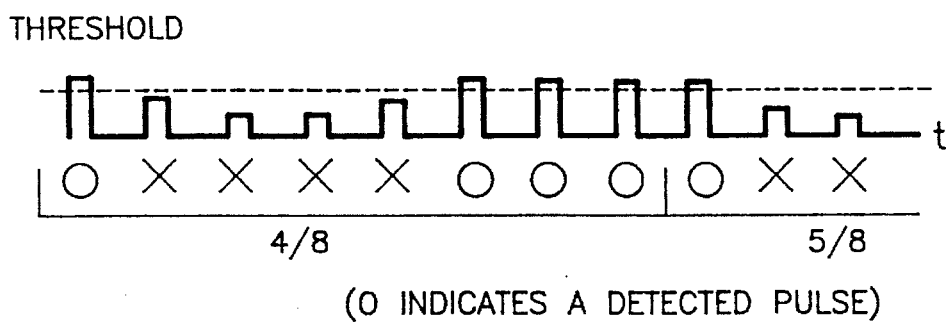
FIG. 3 is a schematic illustration of the relationship between the amplitude of an optical signal to be used for a method for optical telecommunications according to the invention and a threshold level.
Figure 4:
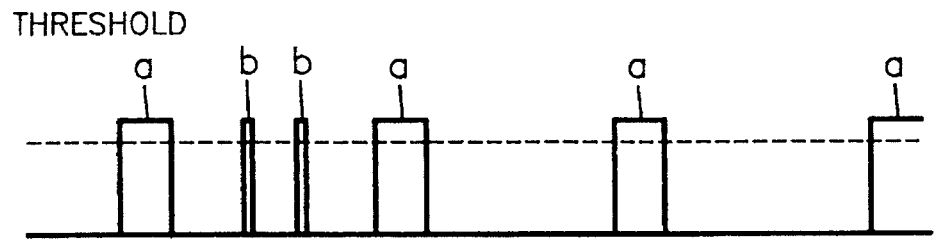
FIG. 4 is a schematic illustration of the relationship between the amplitude of an optical signal to be used for a method for optical telecommunications according to the invention and noise.

Additionally referring to FIG. 4, when k or more than k noises b are found between any two pulses a received at the receiving side (k≧1 and two in FIG. 3), the absence of a modulated optical signal is acknowledged even if more than m pulses are observed at the receiving side.

ADVANTAGES OF THE INVENTION

As described above in detail, with the above described method of the invention, since the optical signal transmitted from the transmission side is modulated by continuous pulses a and a total of n pulses a are extracted in synchronism within a given period of time at the receiving side so that the presence of the modulated optical signal is acknowledged only when a total of m pulses a are received within the given period of time (n≧m), the reliability of the operation of detecting the presence of a modulated signal can he enhanced by allocating a large numeral to m when the state of polarization of the optical signal being transmitted through the optical path is fluctuated and becomes unstable. Thus, with this arrangement, optical signals having an amplitude greater than a predetermined level can be reliably detected and an optical signal modulated by applying an external signal can be easily and surely discriminated from the rest. Additionally, cross talks can be eliminated and noiseless telecommunications can be realized if 100 kHz is used fur optical signals.

With the modified method of the invention as described above, since the absence of an modulated optical signal is acknowledged when noise signals b are found between any successive two of the received pulses, a long noise extending over n pulses would not be mistakenly acknowledged as an optical signal. Thus, a noise b having a large amplitude may not be mistakenly detected as an optical signal so that an optical fiber carrying an optical signal modulated by an external signal can be identified for certainty. Additionally, an excellent S/N ratio can be realized for any optical fiber core within an optical cable regardless of the relative position of the optical fiber core in the optical cable if two or more than two ultrasonic wave signals are applied thereto along different directions.

What is claimed is:

1. A method for optical telecommunications comprising a step of transmitting an optical signal through an optical path (1) of an optical fiber (2) in a plurality of optical paths (1) laid in the form of a cable from the transmission side, applying an external signal to the optical path (1) to modulate the optical signal being transmitted therethrough for the plane of polarization and receiving the optical signal at the receiving side to determine the presence or absence of a modulated optical signal, characterized in that the optical signal is modulated by continuous pulses (a) at the transmitting side and a predetermined number (n) of pulses (a) are extracted within a given period of time in synchronism at the receiving side so that the presence of a modulated optical signal is acknowledged only when (m) or more than (m) pulses (a) are received within a set period of time (n≧m), and further characterized in that the absence of a modulated optical signal is acknowledged even when the above defined number of pulses (a) are received within a set period of time if k or more than k (k≧1) noise signals (b) are found between any successive two of the received pulses (a).

* * * * *